(12) United States Patent
Lunde et al.

(10) Patent No.: US 11,124,747 B2
(45) Date of Patent: Sep. 21, 2021

(54) BREWING METHOD

(71) Applicant: Novozymes A/S, Bagsvaerd (DK)

(72) Inventors: Christina Lunde, Copenhagen (DK); Morten Gjermansen, Greve (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 15/557,159

(22) PCT Filed: Mar. 10, 2016

(86) PCT No.: PCT/EP2016/055131
§ 371 (c)(1),
(2) Date: Sep. 11, 2017

(87) PCT Pub. No.: WO2016/146473
PCT Pub. Date: Sep. 22, 2016

(65) Prior Publication Data
US 2018/0044619 A1    Feb. 15, 2018

(30) Foreign Application Priority Data

Mar. 19, 2015 (EP) ..................................... 15159863

(51) Int. Cl.
*C12C 5/00* (2006.01)
*C12C 7/04* (2006.01)
*C12C 7/047* (2006.01)

(52) U.S. Cl.
CPC .............. *C12C 5/004* (2013.01); *C12C 5/006* (2013.01); *C12C 7/04* (2013.01); *C12C 7/047* (2013.01); *C12Y 301/01* (2013.01); *C12Y 302/01* (2013.01); *C12Y 302/01001* (2013.01); *C12Y 302/01006* (2013.01); *C12Y 302/01008* (2013.01); *C12Y 302/01032* (2013.01); *C12Y 302/01041* (2013.01); *C12Y 304/00* (2013.01)

(58) Field of Classification Search
CPC ......... C12C 5/004; C12C 7/04; C12C 11/003; C12C 7/047; C12C 12/04; C12C 12/00; C12C 12/02; A23L 2/382; A23L 7/107; C12N 9/2457
USPC ................ 426/592, 16, 64, 29, 11, 7, 18, 28
See application file for complete search history.

(56) References Cited

FOREIGN PATENT DOCUMENTS

| JP | 10225287 A | 8/1998 |
|----|------------|--------|
| WO | 2004/011591 A1 | 2/2004 |
| WO | 2009/074650 A2 | 6/2009 |
| WO | 2011/058105 A1 | 5/2011 |
| WO | 2014/194054 A1 | 12/2014 |
| WO | 2015/032850 A1 | 3/2015 |

OTHER PUBLICATIONS

Anonymous, 2015, NCBI Reference sequence WP_044745074.1.

*Primary Examiner* — Vera Stulii
(74) *Attorney, Agent, or Firm* — Kelly Reynolds

(57) ABSTRACT

A method of preparing a wort with an increased level of free amino nitrogen (FAN) comprising: a) preparing a mash from a grist comprising malt and/or adjunct; and b) adding a protease having at least 80% sequence identity to the polypeptide of SEQ ID NO: 1.

13 Claims, No Drawings
Specification includes a Sequence Listing.

BREWING METHOD

CROSS-REFERENCE TO RELATED APPLICATIONS

This application is a 35 U.S.C. 371 national application of PCT/EP2016/055131/ filed Mar. 10, 2016, which claims priority or the benefit under 35 U.S.C. 119 of European application no. 15159863.8 filed Mar. 19, 2015, the contents of which are fully incorporated herein by reference.

REFERENCE TO SEQUENCE LISTING

This application contains a Sequence Listing in computer readable form. The computer readable form is incorporated herein by reference.

FIELD OF THE INVENTION

This invention relates to wort making for brewing and non-alcoholic beverages. More particularly, it relates to a method of increasing the level of free amino nitrogen in a wort.

BACKGROUND OF THE INVENTION

Modern breweries need to have a high level of raw material flexibility with respect to adjunct inclusion and malt quality.

When adjuncts like corn grits, barley or rice are used in the brewing process instead of malt, or when under-modified low quality malt is used, this will result in a level of free amino nitrogen that is insufficient to have proper yeast fermentation.

Wort nitrogen is normally determined as FAN (free amino nitrogen). FAN includes all free primary amines and thus also includes amines of nucleotides and other compounds which are not amino acids.

The inventors have found a surprisingly good method of increasing the level of FAN in a wort.

SUMMARY OF THE INVENTION

Surprisingly, it has been found that it is possible to significantly increase the level of FAN in a wort, so we claim:

A method of preparing a wort with an increased level of free amino nitrogen (FAN) comprising:
a) preparing a mash from a grist comprising malt and/or adjunct; and
b) adding a protease having at least 80% sequence identity to the polypeptide of SEQ ID NO: 1.

In one embodiment, the protease comprises or consists of the amino acid sequence of SEQ ID NO: 1.

In one embodiment, the protease is a variant of the polypeptide of SEQ ID NO: 1 comprising a substitution, deletion, and/or insertion at one or more positions.

In one embodiment, the protease is added to the mash or to the wort.

In one embodiment, the amount of free amino nitrogen (FAN) is increased by at least 20% as compared to a wort produced in the absence of the protease.

In one embodiment, additionally an alpha amylase is added to the mash.

In one embodiment, additionally a beta glucanase is added to the mash.

In one embodiment, additionally a pullulanase is added to the mash.

In one embodiment, additionally a xylanase is added to the mash.

In one embodiment, additionally a lipase is added to the mash.

In one embodiment, the protease is added in an amount of 1-100 mg enzyme protein per kg grist.

In one embodiment, the grist comprises at least 10% (w/w) adjunct.

In one embodiment, the adjunct is selected from the group consisting of barley, rice, corn, sorghum and cassava.

In one embodiment, the wort is fermented to obtain a beer.

In one embodiment, the protease according to the invention shortens the total fermentation time of the beer.

The invention also describes use of a protease having at least 80% sequence identity to the polypeptide of SEQ ID NO: 1 in wort production.

DEFINITIONS

Polypeptides Having Protease Activity

Polypeptides having protease activity, or proteases, are sometimes also designated peptidases, proteinases, peptide hydrolases, or proteolytic enzymes.

The term "protease" is defined herein as an enzyme that hydrolyses peptide bonds. This definition of protease also applies to the protease-part of the terms "parent protease" and "protease variant," as used herein. The term "protease" includes any enzyme belonging to the EC 3.4 enzyme group (including each of the thirteen subclasses thereof). The EC number refers to Enzyme Nomenclature 1992 from NC-IUBMB, Academic Press, San Diego, Calif., including supplements 1-5 published in Eur. J. Bio-chem. 1994, 223, 1-5; Eur. J. Biochem. 1995, 232, 1-6; Eur. J. Biochem. 1996, 237, 1-5; Eur. J. Biochem. 1997, 250, 1-6; and Eur. J. Biochem. 1999, 264, 610-650. The nomenclature is regularly supplemented and updated; see e.g. the World Wide Web (WWW) at http://www.chem.qmw.ac.uk/iubmb/enzyme/index.html.

Protease activity can be measured using any assay, in which a substrate is employed, that includes peptide bonds relevant for the specificity of the protease in question. Assay-pH and assay-temperature are likewise to be adapted to the protease in question. Examples of assay-pH-values are pH 2, 3, 4, 5, 6, 7, 8, 9, 10, 11, or 12. Examples of assay-temperatures are 15, 20, 25, 30, 35, 37, 40, 45, 50, 55, 60, 65, 70, 80, 90, or 95° C. Examples of protease substrates are casein, such as Azurine-Crosslinked Casein (AZCL-casein).

Protease activity: The term "protease activity" means a proteolytic activity that catalyzes the hydrolysis of amide bond or a protein by hydrolysis of the peptide bond that link amino acids together in a polypeptide chain. Several assays for determining protease activity are available in the art. For purposes of the present invention, protease activity may be determined using Protazyme AK tablet (cross-linked and dyed casein; from Megazyme) or suc-AAPF-pNA. The polypeptides of the present invention have at least 20%, e.g., at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, or at least 100% of the protease activity of the polypeptide of SEQ ID NO: 1.

Allelic variant: The term "allelic variant" means any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Catalytic domain: The term "catalytic domain" means the region of an enzyme containing the catalytic machinery of the enzyme.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Fragment: The term "fragment" means a polypeptide having one or more (e.g., several) amino acids absent from the amino and/or carboxyl terminus of a mature polypeptide or domain; wherein the fragment has protease activity.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., multiple copies of a gene encoding the substance; use of a stronger promoter than the promoter naturally associated with the gene encoding the substance). An isolated substance may be present in a fermentation broth sample.

Mature polypeptide: The term "mature polypeptide" means a polypeptide in its final form following translation and any post-translational modifications, such as N-terminal processing, C-terminal truncation, glycosylation, phosphorylation, etc. In one aspect, the polypeptide is amino acids 1 to 301 of SEQ ID NO: 1.

Mature polypeptide coding sequence: The term "mature polypeptide coding sequence" means a polynucleotide that encodes a mature polypeptide having protease activity.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration, in which a control sequence is placed at an appropriate position relative to the coding sequence of a polynucleotide, in such a way that the control sequence directs expression of the coding sequence.

Sequence identity: The relatedness between two amino acid sequences or between two nucleotide sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the –nobrief option) is used as the percent identity and is calculated as follows:

(Identical Residues×100)/(Length of Alignment–
Total Number of Gaps in Alignment).

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the –nobrief option) is used as the percent identity and is calculated as follows:

(Identical Deoxyribonucleotides×100)/(Length of
Alignment–Total Number of Gaps in Alignment).

Subsequence: The term "subsequence" means a polynucleotide having one or more (e.g., several) nucleotides absent from the 5' and/or 3' end of a mature polypeptide coding sequence; wherein the subsequence encodes a fragment having protease activity.

Variant: The term "variant" means a polypeptide having protease activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding one or more (e.g. several) amino acids, e.g., 1-5 amino acids adjacent to and immediately following the amino acid occupying a position. The variants of the present invention have at least 20%, e.g., at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, or at least 100% of the protease activity of the polypeptide of SEQ ID NO: 1.

Beverage: The term beverage as used herein has the conventional meaning in the art and includes, but not limited to beer, and any wort based beverage.

Beer: The term "beer" as used herein is intended to cover at least beer prepared from mashes prepared from unmalted cereals as well as all mashes prepared from malted cereals, and all mashes prepared from a mixture of malted and unmalted cereals. The term "beer" also covers beers prepared with adjuncts, and beers with all possible alcohol contents.

Grist: The term "grist" is understood as the starch or sugar containing material that is the basis for beer production, e.g., the barley malt and the adjunct. Generally, the grist does not contain any added water.

Malt: The term "malt" is understood as any malted cereal grain, in particular barley.

Adjunct: The term "adjunct" is understood as the part of the grist which is not barley malt. The adjunct may be any starch rich plant material, e.g., unmalted grain, such as, but not limited to, barley, corn, rice, sorghum, and wheat and also includes readily fermentable sugar and/or syrup. The starch of some of the adjuncts has a relatively low gelatinization temperature which enable them to be mashed in together with the malt, whereas other adjuncts such as rice, corn and sorghum has a higher gelatinization temperature, such adjuncts are typically separately cooked and liquefied with an alpha-amylase before they are added to the mash.

Mash: The term "mash" is understood as a starch containing slurry comprising crushed barley malt, and/or crushed unmalted grain, and/or other starch containing material, or a combination hereof, steeped in water to make wort.

Wort: The term "wort" is understood as the unfermented liquor run-off following extracting the grist during mashing.

DETAILED DESCRIPTION OF THE INVENTION

The advantage of the present invention is that it allows the breweries to have a higher level of raw material flexibility with respect to adjunct inclusion and malt quality.

When adjuncts like corn grits, barley or rice are included in the brewing process instead of malt, the level of FAN (free amino nitrogen) will be insufficient to have proper yeast fermentation. The same issue occurs when an under-modified low quality malt is used.

During mashing the endogenous malt proteases are capable of increasing the overall FAN level. This increase occurs mainly during the protein rest (e.g., 20 min, 50° C.).

Adding the protease according to the invention to the mash may allow the breweries to eliminate the protein rest without losing FAN. Eliminating the protein rest will save time and energy in the brewing process and also minimize the lipoxygenase (LOX) catalyzed lipid oxidation leading to off-flavors in the final product.

Wort Production

The present invention relates to a method of producing a wort with an increased level of FAN, wherein a protease that has at least 80% sequence identity to the sequence shown in SEQ ID NO: 1 has been added to the mash or the wort.

The mash is obtainable by grounding a grist comprising malt and/or adjunct. Water may preferably be added to the grist, and is normally preheated in order for the mash to attain the desired mash temperature at the moment of mash forming. If the temperature of the formed mash is below the desired mashing temperature, additional heat is preferably supplied in order to attain the desired process temperature.

The temperature profile of the mashing process may be a profile from a conventional mashing process wherein the temperatures are set to achieve optimal degradation of the grist dry matter by the malt enzymes and the added enzymes.

The malt is preferably derived from one or more of the grains selected from the list consisting of, e.g., corn, barley, wheat, rye, sorghum, millet and rice.

Preferably, the malt is barley malt. The grist preferably comprises from 0.5% to 99% (w/w) malt, preferably from 1% to 95% (w/w) malt, more preferably from 5% to 90% (w/w) malt, even more preferably from 10% to 80% (w/w) malt.

In addition to malted grain, the grist may comprise one or more adjuncts such as unmalted corn, or other unmalted grain, such as barley, wheat, rye, oat, corn, rice, milo, millet and/or sorghum, or raw and/or refined starch and/or sugar containing material derived from plants like wheat, rye, oat, corn, rice, milo, millet, sorghum, pea, potato, sweet potato, cassava, tapioca, sago, banana, sugar beet and/or sugar cane. According to the present invention, adjuncts may be obtained from tubers, roots, stems, leaves, legumes, cereals and/or whole grain.

Preferred is adjunct obtained from barley, corn, rice, sorghum and/or cassava; e.g., rice starch, corn starch, and/or corn grits.

The grist comprises typically from 1% to 80% (w/w) adjunct, e.g., from 5% to 75% (w/w) adjunct, e.g., from 10% to 70% (w/w) adjunct; in particular the grist comprises at least 10% (w/w) adjunct. In a preferred embodiment, the grist comprises from 30% to 70% (w/w) adjunct.

In one aspect, the protease is introduced at the beginning of mashing. In another aspect, the protease is introduced during mashing. In another aspect, the protease is added to the wort.

The amount of added protease according to the invention generally depends on various factors. For purposes of this invention, the amount of protease used will generally be of from 0.1 mg to 100 mg EP (Enzyme Protein) per kg grist, preferably from 1 mg to 100 mg EP (Enzyme Protein) per kg grist; preferably from 1 mg to 50 mg EP (Enzyme Protein) per kg grist.

In a preferred embodiment, the amount of free amino nitrogen in the wort is increased by at least 20% as compared to a wort produced in the absence of the protease according to the invention, e.g., the amount of free amino nitrogen in the wort is increased by at least 30% as compared to a wort produced in the absence of the protease according to the invention, e.g., the amount of free amino nitrogen in the wort is increased by at least 40% as compared to a wort produced in the absence of the protease according to the invention, e.g., the amount of free amino nitrogen in the wort is increased by at least 50% as compared to a wort produced in the absence of the protease according to the invention.

In another preferred embodiment, a further enzyme(s) is added to the mash, said enzyme(s) including but not limited to alpha amylase, isoamylase, maltogenic amylase, protease, cellulase, beta glucanase, pullulanase, laccase, xylanase, lipase, phospholipase, phytase, and esterase.

In one aspect of the method, the further enzyme added includes a pullulanase.

In one aspect of the method, the further enzyme added includes an amylase, preferably an alpha amylase.

In one aspect of the method, the further enzyme added includes a beta glucanase.

In one aspect of the method, the further enzyme added includes a xylanase.

In one aspect of the method, the further enzyme added includes a lipase.

Following the separation of the wort from the spent grains of the grist, the wort may be used as it is or it may be dewatered to provide a concentrated and/or dried wort. The concentrated and/or dried wort may be used as brewing extract, as malt extract flavoring, for non-alcoholic malt beverages, malt vinegar, breakfast cereals, for confectionary, etc.

In a preferred embodiment, the wort is fermented to produce an alcoholic beverage, preferably a beer, e.g., ale, strong ale, bitter, stout, porter, lager, export beer, malt liquor, barley wine, happoushu, high-alcohol beer, low-alcohol beer, low-calorie beer or light beer.

Fermentation of the wort may include pitching the wort with a yeast slurry comprising fresh yeast, i.e., yeast not previously used or the yeast may be recycled yeast. The yeast applied may be any yeast suitable for beer brewing, especially yeasts selected from *Saccharomyces* spp. such as *S. cerevisiae* and *S. uvarum,* including natural or artificially produced variants of these organisms.

It is an advantage that the protease according to the invention may shorten the total fermentation time.

The methods for fermentation of wort for production of beer are well known to the person skilled in the arts.

Proteases According to the Invention

The protease SEQ ID NO:1 is obtainable from *Anoxybacillus rupiensis* and disclosed in WO2014/194054 for use in detergents.

In one embodiment, the present invention relates to an isolated polypeptide having a sequence identity to the polypeptide of SEQ ID NO: 1 of at least 80%, at least 81%, at least 82%, at least 83%, at least 84% at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%, which have protease activity.

A polypeptide of the present invention preferably comprises or consists of the amino acid sequence of SEQ ID NO: 1 or an allelic variant thereof; or is a fragment thereof having protease activity. In another aspect, the polypeptide comprises or consists of the polypeptide of SEQ ID NO: 1.

In another embodiment, the present invention relates to an isolated polypeptide having protease activity encoded by a polynucleotide that hybridizes under low stringency conditions, medium stringency conditions, medium-high stringency conditions, high stringency conditions with the polypeptide coding sequence of SEQ ID NO: 1, or the full-length complement thereof (Sambrook et al., 1989, *Molecular Cloning, A Laboratory Manual,* 2d edition, Cold Spring Harbor, New York).

In another embodiment, the present invention relates to variants of the polypeptide of SEQ ID NO: 1 comprising a substitution, deletion, and/or insertion at one or more (e.g., several) positions.

In an embodiment, the number of amino acid substitutions, deletions and/or insertions introduced into the polypeptide of SEQ ID NO: 1 is not more than 20, e.g., 1, 2, 3, 4, 5, 6, 7, 8, 9, 10, 11, 12, 13, 14, 15, 16, 17, 18, 19, or 20.

The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, *In, The Proteins,* Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Alternatively, the amino acid changes are of such a nature that the physico-chemical properties of the polypeptides are altered. For example, amino acid changes may improve the thermal stability of the polypeptide, alter the substrate specificity, change the pH optimum, and the like.

Essential amino acids in a polypeptide can be identified according to procedures known in the art, such as site-directed mutagenesis or alanine-scanning mutagenesis (Cunningham and Wells, 1989, *Science* 244: 1081-1085). In the latter technique, single alanine mutations are introduced at every residue in the molecule, and the resultant mutant molecules are tested for protease activity to identify amino acid residues that are critical to the activity of the molecule. See also, Hilton et al., 1996, *J. Biol. Chem.* 271: 4699-4708. The active site of the enzyme or other biological interaction can also be determined by physical analysis of structure, as determined by such techniques as nuclear magnetic resonance, crystallography, electron diffraction, or photoaffinity labeling, in conjunction with mutation of putative contact site amino acids. See, for example, de Vos et al., 1992, *Science* 255: 306-312; Smith et al., 1992, *J. Mol. Biol.* 224: 899-904; Wlodaver et al., 1992, *FEBS Lett.* 309: 59-64. The identity of essential amino acids can also be inferred from an alignment with a related polypeptide.

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, *Science* 241: 53-57; Bowie and Sauer, 1989, *Proc. Natl. Acad. Sci. USA* 86: 2152-2156; WO 95/17413; or WO 95/22625. Other methods that can be used include error-prone PCR, phage display (e.g., Lowman et al., 1991, *Biochemistry* 30: 10832-10837; U.S. Pat. No. 5,223,409; WO 92/06204), and region-directed mutagenesis (Derbyshire et al., 1986, *Gene* 46: 145; Ner et al., 1988, *DNA* 7: 127).

Mutagenesis/shuffling methods can be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

The polypeptide may be a hybrid polypeptide in which a region of one polypeptide is fused at the N-terminus or the C-terminus of a region of another polypeptide.

The polypeptide may be a fusion polypeptide or cleavable fusion polypeptide in which another polypeptide is fused at the N-terminus or the C-terminus of the polypeptide of the present invention. A fusion polypeptide is produced by fusing a polynucleotide encoding another polypeptide to a polynucleotide of the present invention. Techniques for producing fusion polypeptides are known in the art, and include ligating the coding sequences encoding the polypeptides so that they are in frame and that expression of the fusion polypeptide is under control of the same promoter(s) and terminator. Fusion polypeptides may also be constructed using intein technology in which fusion polypeptides are created post-translationally (Cooper et al., 1993, *EMBO J.* 12: 2575-2583; Dawson et al., 1994, *Science* 266: 776-779).

A fusion polypeptide can further comprise a cleavage site between the two polypeptides. Upon secretion of the fusion protein, the site is cleaved releasing the two polypeptides. Examples of cleavage sites include, but are not limited to, the sites disclosed in Martin et al., 2003, *J. Ind. Microbiol. Biotechnol.* 3: 568-576; Svetina et al., 2000, *J. Biotechnol.* 76: 245-251; Rasmussen-Wilson et al., 1997, *Appl. Environ. Microbiol.* 63: 3488-3493; Ward et al., 1995, *Biotechnology* 13: 498-503; and Contreras et al., 1991, *Biotechnology* 9: 378-381; Eaton et al., 1986, *Biochemistry* 25: 505-512; Collins-Racie et al., 1995, *Biotechnology* 13: 982-987; Carter et al., 1989, *Proteins: Structure, Function, and Genetics* 6: 240-248; and Stevens, 2003, *Drug Discovery World* 4: 35-48.

Enzyme Compositions

The present invention also relates to compositions comprising a polypeptide of the present invention for use in wort production.

The compositions according to the invention may comprise a polypeptide of the present invention as the major enzymatic component, e.g., a mono-component composition.

Alternatively, the compositions may comprise multiple enzymatic activities, such as one or more (e.g., several) enzymes selected from the group consisting of hydrolase, isomerase, ligase, lyase, oxidoreductase, or transferase, e.g., an alpha-galactosidase, alpha-glucosidase, aminopeptidase, amylase, beta-galactosidase, beta-glucosidase, beta-xylosidase, carbohydrase, carboxypeptidase, catalase, cellobiohydrolase, cellulase, chitinase, cutinase, cyclodextrin glycosyltransferase, deoxyribonuclease, endoglucanase, esterase, glucoamylase, invertase, laccase, lipase, mannosidase, mutanase, oxidase, pectinolytic enzyme, peroxidase, phytase, polyphenoloxidase, proteolytic enzyme, ribonuclease, transglutaminase, or xylanase.

Preferably, the composition for use in wort production may comprise the protease having at least 80% sequence identity to the polypeptide of SEQ ID NO: 1; or a composition for use in wort production may comprise the protease having at least 80% sequence identity and one or more enzymes selected from the group consisting of alpha amylase, beta glucanase, pullulanase, xylanase, and lipase.

The compositions may be prepared in accordance with methods known in the art and may be in the form of a liquid or a dry composition. The compositions may be stabilized in accordance with methods known in the art.

Examples are given below of preferred uses of the compositions of the present invention. The dosage of the composition and other conditions under which the composition is used may be determined on the basis of methods known in the art.

The present invention is further described by the following examples that should not be construed as limiting the scope of the invention.

EXAMPLE 1

Adding a Protease (SEQ ID NO:1) with Improved Free Amino Nitrogen (FAN) Generation During Small Scale Mashing The protease (SEQ ID NO:1) was compared to the protease Neutrase™ (Novozymes NS) using the following procedure:

1. Add 5 g corn starch to 100 mL Blue Cap bottles with magnetic stirrer.
2. Grind the malt (from Danish Malting Group (Prod nr 2012-0646)) at gap 0.2 mm (Bühler mill) and weigh out 5 g in weighing plastic cups.
3. Add 25 mL 95° C. $H_2O$, 300 µL $CaCl_2$ (0.2 M) and 300 ppm Termamyl™ (Novozymes A/S) to each bottle with 5 g of corn starch
4. Do decoction according to mashing profile (see Table 1 below).
5. Cool down to 50° C. by adding ice or cold water in the water bath, add 5 g of malt, 25 mL 52° C. $H_2O$, 0.3 mL $CaCl_2$, and protease according to set-up (5, 10, and 15 mg enzyme protein/kg grist) to each blue cap bottle.
6. Ready for mashing, set time, and do the mashing manually by setting the temperature on the water bath.
7. Cool down to 30° C. and filtrate with small funnels, 50 mL volumetric cylinders and folded filters (Whatman 597½, ø185 mm).
8. Measure the level of Free Amino Nitrogen using NOPA assay and a Gallery Plus. (The NOPA assay was Alpha-Amino Nitrogen (NOPA) test kit from Thermo Fisher Scientific (Cat. No. 984342)).

TABLE 1

| Mashing profiles: | |
| --- | --- |
| Temperature [° C.] | Time [min.] |
| Corn Starch - decoction: | |
| 95 | 30 |
| Malt and Corn mashing with a protein rest: | |
| 50 | 20 |
| 63 | 30 |
| 72 | 20 |
| 78 | 15 |
| 20 | — |

TABLE 1-continued

Mashing profiles:

| Temperature [° C.] | Time [min.] |
|---|---|
| Malt and Corn mashing without a protein rest: | |
| 63 | 50 |
| 72 | 20 |
| 78 | 15 |
| 20 | — |

Results:

TABLE 2

FAN results with a protein rest:

| | Protease: | | |
|---|---|---|---|
| | 5 mg EP/kg grist | 10 mg EP/kg grist | 15 mg EP/kg grist |
| FAN results with Neutrase: | 24 ppm | 34 ppm | 40 ppm |
| FAN results with SEQ ID NO: 1: | 51 ppm | 70 ppm | 84 ppm |

TABLE 3

FAN results without a protein rest:

| | Protease: | | |
|---|---|---|---|
| | 5 mg EP/kg grist | 10 mg EP/kg grist | 15 mg EP/kg grist |
| FAN results with Neutrase: | 8 ppm | 12 ppm | 18 ppm |
| FAN results with SEQ ID NO: 1: | 44 ppm | 64 ppm | 73 ppm |

It can be seen from Table 2 and Table 3 that the protease SEQ ID NO:1 gives surprisingly more FAN than Neutrase.

EXAMPLE 2

Adding a Protease (SEQ ID NO:1) with Improved Free Amino Nitrogen (FAN) in Lab Fermentation Mashing:
1. Grind 1000 g malt (gap 0.2 mm)
2. Add 75 g malt to each of 12 beakers
3. Add 300 mL 52° C. water and 4.5 mL $CaCl_2$ (0.2 M) solutions
4. Make the following mashing profile:

| Temperature [° C.] | Time [min] |
|---|---|
| 50 | 20 |
| 63 | 30 |
| 72 | 20 |

-continued

| Temperature [° C.] | Time [min] |
|---|---|
| 78 | 15 |
| 20 | — |

5. Just after start, add the protease (SEQ ID NO:1 or Neutrase™—10 mg EP/kg grist) and 300 ppm Termamyl™
6. After mashing, adjust to 450 g with water in each beaker
7. Filter the samples using Falten filer 597½
8. Mix 500 mL wort in 8 bluecap bottles, according to set up
9. Weigh out 159 mg hops (Hallertau Hallertauer Taurus (Alpha 17%)) in each bottle and boil for 40 min
10. Cool down and adjust the bottles for water loss with sterile water
11. Centrifuge at 8000 rpm for 30 min and transfer the supernatant to sterile bluecaps Yeast:
Weigh out 100 g of YPD (Yeast peptone dextrose media for growing yeast) in a 2000 mL Pyrex flask containing 1 stirring bar—add 1000 mL of MQ water and autoclave the solution.
Let it cool to 25° C.
"Under sterile condition" add one bag of dry yeast (Saflager w-34/70 (11.5 g; Lesafre)) to the YPD media
Place the solution in fume hood and bubble sterile air through the solution, with stirring medium to high.
Let it bubble and stir overnight
Transfer the yeast to 2×500 mL centrifugation bottles
Centrifuge the yeast at 2000 rpm for 3 minutes
Discard the supernatant and re-suspend the supernatant in 250 mL sterile water. Transfer all the yeast to one 500 mL centrifugation bottle. Repeat this process 3 times
After the final rinse, the yeast pellets are re-suspended in 200 mL sterile water
Make a dilution series 1:10, 1:100 and 1:1.000. Count the yeast cells in the 1:1000 dilution
Add propagated yeast into the wort to reach $2\times10^7$ cells/mL and loosely close the lid Fermentation:
Place the bluecaps on shaking table, 145 rpm. at 12° C. for 5 days
After 5 days—turn the shaking table down to 120 rpm for the next 2 days
Cool the sample down to 0° C. (put it on ice in a styrofoam box with a lid and place the box in the cold-room in the basement 5° C.)
Let it stand there for 5 days Results:
The results confirmed the small scale mashing (Example 1):
The protease (SEQ ID NO:1) released significantly more FAN than Neutrase™ (more than 40%), when 10 mg EP/kg grist was added.
The final beer was analyzed, and no adverse effects were observed (foam damage, etc.).

The invention claimed is:

1. A method of preparing a wort with an increased level of free amino nitrogen (FAN) comprising:
   a) preparing a mash from a grist comprising malt and/or adjunct;
   b) preparing a wort from the mash; and
   c) adding a protease having at least 80% sequence identity to the polypeptide of SEQ ID NO: 1 to the mash or to the wort in an amount of 5-15mg EP/kg grist,
wherein the grist comprises at least 40% malt, and wherein the prepared wort has at least 40% more FAN as compared to the level of FAN in a wort produced in the absence of the protease.

2. The method according to claim 1, wherein the protease comprises or consists of the amino acid sequence of SEQ ID NO: 1.

3. The method according to claim 1, wherein the protease is a variant of the polypeptide of SEQ ID NO: 1 comprising a substitution, deletion, and/or insertion at one or more positions.

4. The method according to claim 1, further comprising adding an alpha amylase to the mash.

5. The method according to claim 1, further comprising adding a beta glucanase to the mash.

6. The method according to claim 1, further comprising adding a pullulanase to the mash.

7. The method according to claim 1, further comprising adding a xylanase to the mash.

8. The method according to claim 1, wherein additionally a lipase is added to the mash.

9. The method according to claim 1, wherein the grist comprises at least 10% (w/w) adjunct.

10. The method according to claim 1, wherein the adjunct is selected from the group consisting of barley, rice, corn, sorghum and cassava.

11. The method according to claim 1, wherein the wort is fermented to obtain a beer.

12. The method according to claim 1, wherein a protein rest step is not included after protease addition.

13. A method of preparing a beer with stable foam, the method comprising:
   a) preparing a mash from a grist comprising malt and/or adjunct;
   b) preparing a wort from the mash;
   c) adding a protease having at least 80% sequence identity to the polypeptide of SEQ ID NO: 1 to the mash or to the wort in an amount of 5-15 mg EP/kg grist, wherein the grist comprises at least 40% malt, and wherein the prepared wort has at least 40% more FAN as compared to the level of FAN in a wort produced in the absence of the protease; and
   d) fermenting the wort to form a beer, wherein foam stability of the beer is not negatively affected by addition of the protease.

* * * * *

SEQUENCE LISTING

<160> NUMBER OF SEQ ID NOS: 1

<210> SEQ ID NO 1
<211> LENGTH: 301

```
<212> TYPE: PRT
<213> ORGANISM: Anoxybacillus rupiensis

<400> SEQUENCE: 1

Glu Ala Thr Ser Gly Tyr Gly Tyr Gly Val Leu Gly Asp Tyr Lys Thr
1               5                   10                  15

Leu Asn Thr Tyr Tyr Ser Asn Gly Thr Tyr Tyr Leu Tyr Asp Val Thr
            20                  25                  30

Lys Pro Met Ser Gly Val Ile Glu Thr Arg Thr Ala Gln Asn Gly Thr
        35                  40                  45

Ser Leu Pro Gly Ser Tyr Ser Val Asp Ser Asn Asn Ala Trp Thr Ala
    50                  55                  60

Ser Ser Gln Arg Ala Asp Val Asp Ala His Tyr Tyr Ala Gly Val Val
65                  70                  75                  80

Tyr Asp Tyr Tyr Lys Asn Thr His Asn Arg Asn Ser Phe Asp Asn Asn
                85                  90                  95

Gly Ala Thr Ile Arg Ser Thr Val His Tyr Ser Asn Arg Tyr Asn Asn
            100                 105                 110

Ala Phe Trp Asn Gly Val Gln Met Val Tyr Gly Asp Gly Asp Gly Thr
        115                 120                 125

Thr Phe Ala Pro Leu Ser Gly Gly Leu Asp Val Val Ala His Glu Leu
130                 135                 140

Thr His Ala Val Thr Asp Arg Thr Ala Gly Leu Glu Tyr Arg Asn Gln
145                 150                 155                 160

Ser Gly Ala Leu Asn Glu Ser Met Ser Asp Val Phe Ala Cys Phe Val
            165                 170                 175

Asp Ser Asn Asp Tyr Leu Ile Gly Glu Asp Val Tyr Thr Pro Asn Val
            180                 185                 190

Ser Gly Asp Ala Leu Arg Ser Leu Ser Asn Pro Gln Ala Tyr Gly Gln
            195                 200                 205

Pro Ala His Met Asn Asp Tyr Val Tyr Thr Ser Ser Asp Asn Gly Gly
        210                 215                 220

Val His Thr Asn Ser Gly Ile Pro Asn Lys Ala Ala Tyr Leu Thr Ile
225                 230                 235                 240

Thr Ala Ile Gly Lys Glu Lys Ala Glu Lys Ile Tyr Tyr Arg Ala Leu
                245                 250                 255

Thr Val Tyr Leu Thr Pro Thr Ser Asn Phe Ser Asn Ala Arg Ala Ala
            260                 265                 270

Leu Leu Gln Ala Ala Ala Asp Leu Tyr Gly Ser Gly Ser Ser Thr Tyr
            275                 280                 285

Asn Ala Val Ala Asn Ala Trp Asn Gln Val Gly Val Tyr
            290                 295                 300
```